United States Patent [19]

Yoshida

[11] 4,046,403
[45] Sept. 6, 1977

[54] STRUT TYPE INDEPENDENT SUSPENSION SYSTEM FOR AUTOMOBILES

[75] Inventor: Hiroshi Yoshida, Toyokawa, Japan

[73] Assignee: Mitsubishi Jidosha Kogyo Kabushiki Kaisha, Tokyo, Japan

[21] Appl. No.: 656,696

[22] Filed: Feb. 9, 1976

[30] Foreign Application Priority Data

Feb. 17, 1975 Japan .................................. 50-18766
Dec. 22, 1975 Japan .................................. 50-153115

[51] Int. Cl.$^2$ .............................................. B60G 3/06
[52] U.S. Cl. .................................................. 280/701
[58] Field of Search ............... 280/701, 691, 696, 670, 280/675, 666, 673

[56] References Cited

U.S. PATENT DOCUMENTS

| | | | |
|---|---|---|---|
| 2,069,924 | 2/1937 | Paton | 280/696 |
| 2,096,118 | 10/1937 | Leighton | 280/696 |
| 2,372,744 | 4/1945 | Sherman | 280/673 |
| 3,189,118 | 6/1965 | Arning | 280/701 |
| 3,860,353 | 1/1975 | Lukasik | 280/673 |

Primary Examiner—Richard J. Johnson
Attorney, Agent, or Firm—Wenderoth, Lind & Ponack

[57] ABSTRACT

A strut type independent suspension system for automobiles has a unitary suspension arm which is pivotably supported by a vehicle body at front and rear support points on the vehicle body end and which pivotably supports a housing of an axle bearing at front and rear support points on the axle bearing housing end. The respective rear support points are disposed on a straight line at right angles to a wheel center line as viewed on a horizontal projection. The front and rear support points on the vehicle body end are disposed on a straight line intersecting at a given angle a vehicle body center line as viewed on said horizontal projection, and the front and rear support points on the axle bearing housing end are disposed on a straight line substantially parallel to the straight line on which the vehicle body end support points are disposed.

18 Claims, 13 Drawing Figures

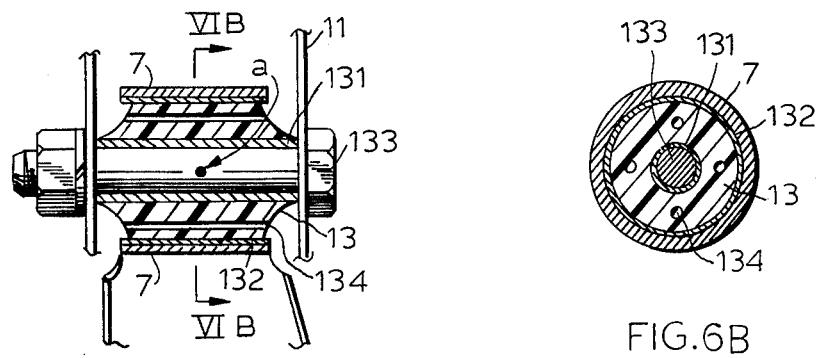
FIG.6A
FIG.6B
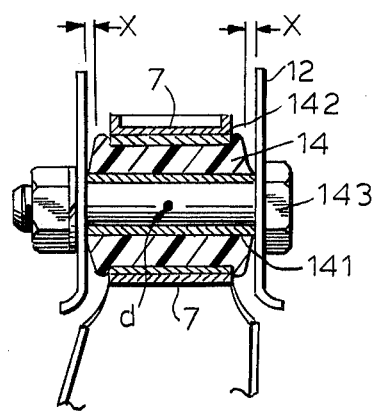
FIG.6C
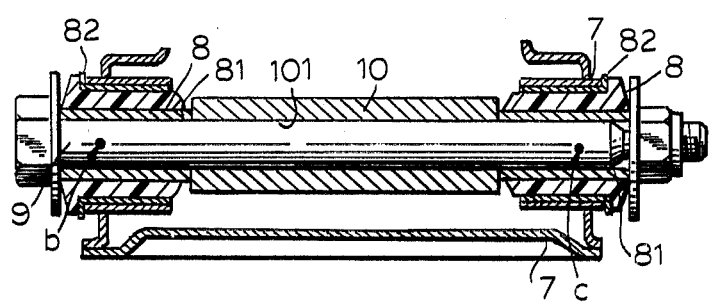
FIG.6D

STRUT TYPE INDEPENDENT SUSPENSION SYSTEM FOR AUTOMOBILES

The present invention relates to improvements in a strut type independent suspension wheel support system for automobiles.

Figure 1:
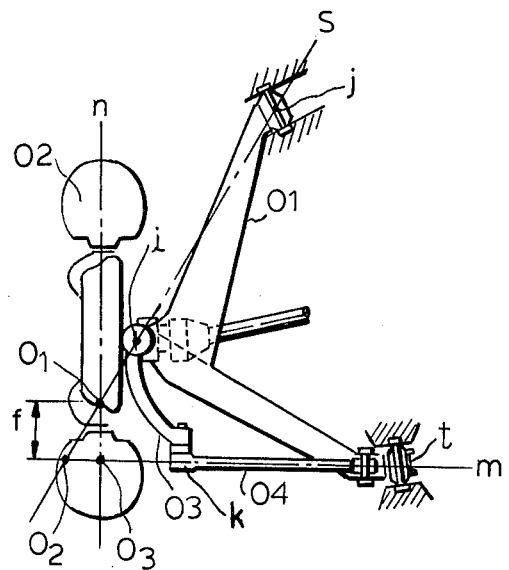
Figure 2:
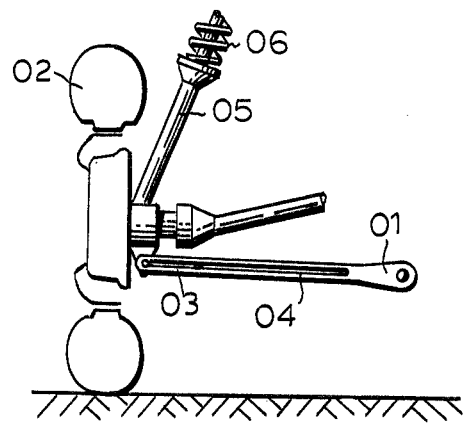

Heretofore, such systems were generally constructed as shown in FIGS. 1 and 2. Since the intersection 01 of a center line $n$ of a wheel 02 and a straight line S connecting a front support point $j$ of a lower arm 01 to be supported by a sub-frame or a body frame and a ball joint $i$ of said lower arm 01 to be coupled to a housing of a boss of the wheel 02, the intersection 02 of said straight line S and another axis $m$ connecting a rear support point $t$ of said lower arm 01 to be supported by a subframe or a body frame and a ball joint $k$ coupling a control arm 03 and a control rod 04, and the intersection 03 of said axis $m$ and said center line $n$ do not coincide with each other, a forward or backward force is exerted upon the support point $t$ of the lower arm 01. Consequently, the sub-frame or body frame which supports the lower arm 01 at said support point $t$ must be strongly reinforced, so that the suspension system had a disadvantage that not only was the structure complex but also had a high cost. In addition, the suspension system had a disadvantage that the number of parts was increased and so the system was disadvantageous with respect to its weight and cost, because the control arm 03 and the control rod 04 had to be provided in addition to the lower arm 01 for the purpose of stabilizing the wheel supporting force. Still further, since the ball joint $i$ for pivotably mounting the lower arm 01 on said housing had a structure adapted to be mounted under the housing as shown in FIG. 2, the system had a disadvantage that the height of the lower arm 01 above the ground was reduced by the body length of the ball joint $i$ plus the length of the ball stud for mounting said lower arm 01 and said control arm 03, and consequently, there was the danger that during running of the vehicle said lower arm might contact the road surface.

In addition, when a strut type suspension system is provided for a drive wheel of an automobile, often a coil spring 06 must be disposed generally along a strut shaft 05 as shown in FIG. 2. In this case, the strut and the drive shaft are movable up and down or back and forth relative to each other. However, in either way, since the vertical reaction force of the wheel is supported by the strut, a bending moment is exerted upon the strut resulting in elastic deformation of the strut rod, so that vertical extension and contraction of the strut is not smooth.

Especially when the strut and the drive shaft are moved back and forth relative to each other because of restriction at the vehicle body end, the offset between the wheel center and the strut shaft increases, and thus the bending moment is greatly increased.

Further, what is especially important in the case of a strut type suspension for a drive wheel is that a space for mounting a tire chain is necessitated between the tire and the strut and so the offset moment is further increased.

It is an object of the present invention to provide an improved strut type independent suspension system for automobiles which is entirely free from the disadvantages of the suspension systems in the prior art as described above.

According to one feature of the present invention, there is provided a strut type independent suspension system for automobiles, characterized in that said system comprises a unitary suspension arm, which is pivotably supported by a vehicle body at two, i.e. front and rear, support points on the vehicle body ends $a$ and $d$, and which pivotably supports a housing of an axle bearing at the other two, i.e. front and rear, support points on the axle bearing housing ends $b$ and $c$; that said respective rear support points $c$ and $d$ are disposed on a straight line at right angles to a wheel center line $n$ as viewed on a horizontal projection; that said front and rear support points on the vehicle body end $a$ and $d$ are disposed on a straight line intersecting at a given angle to a vehicle body center line $p$ as viewed on said horizontal projection; and that said front and rear support points on the axle bearing housing ends $b$ and $c$ are disposed on a straight line substantially parallel to said straight line on which said support points $a$ and $d$ are disposed.

Figure 3:
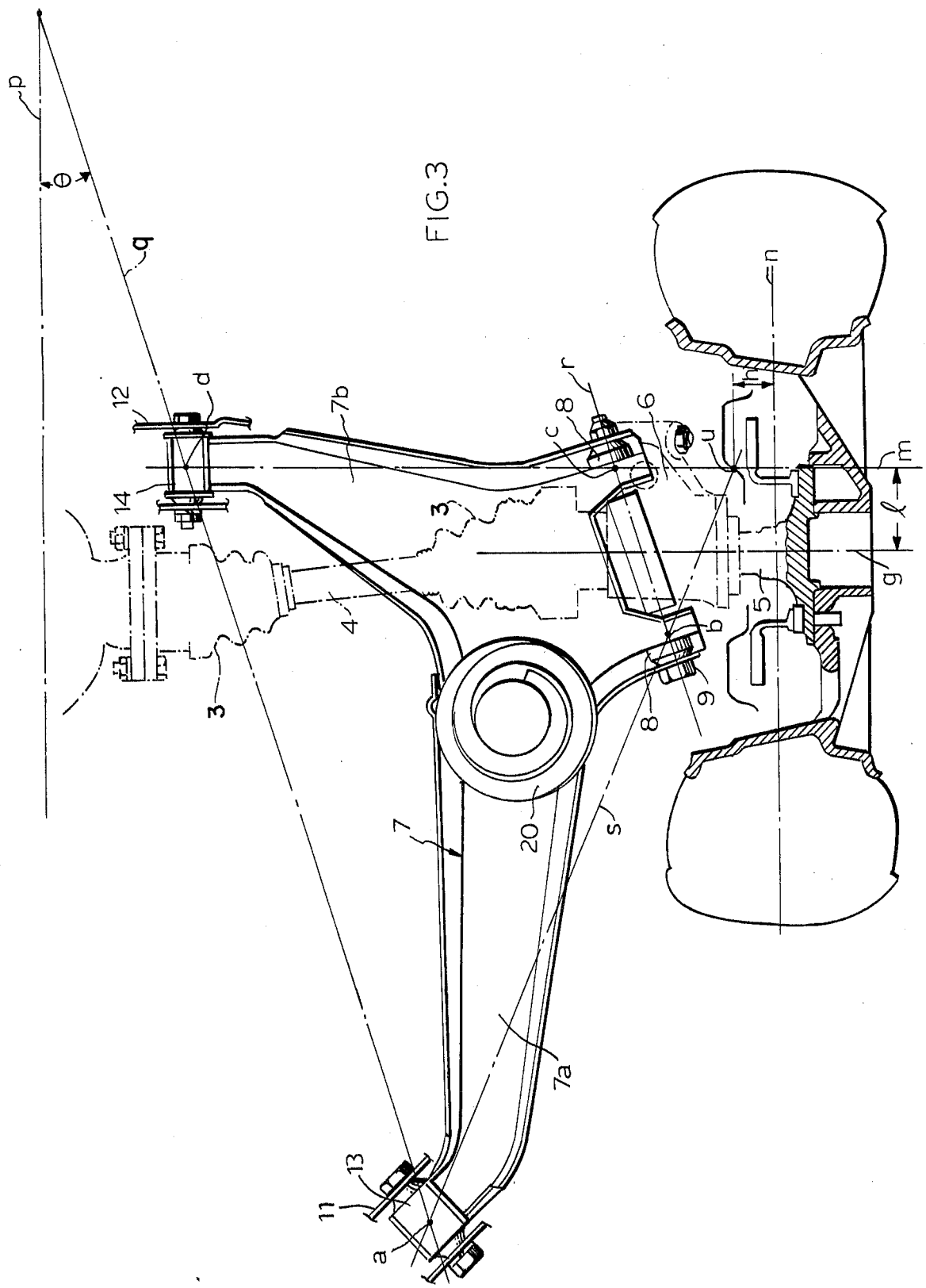
Figure 4:
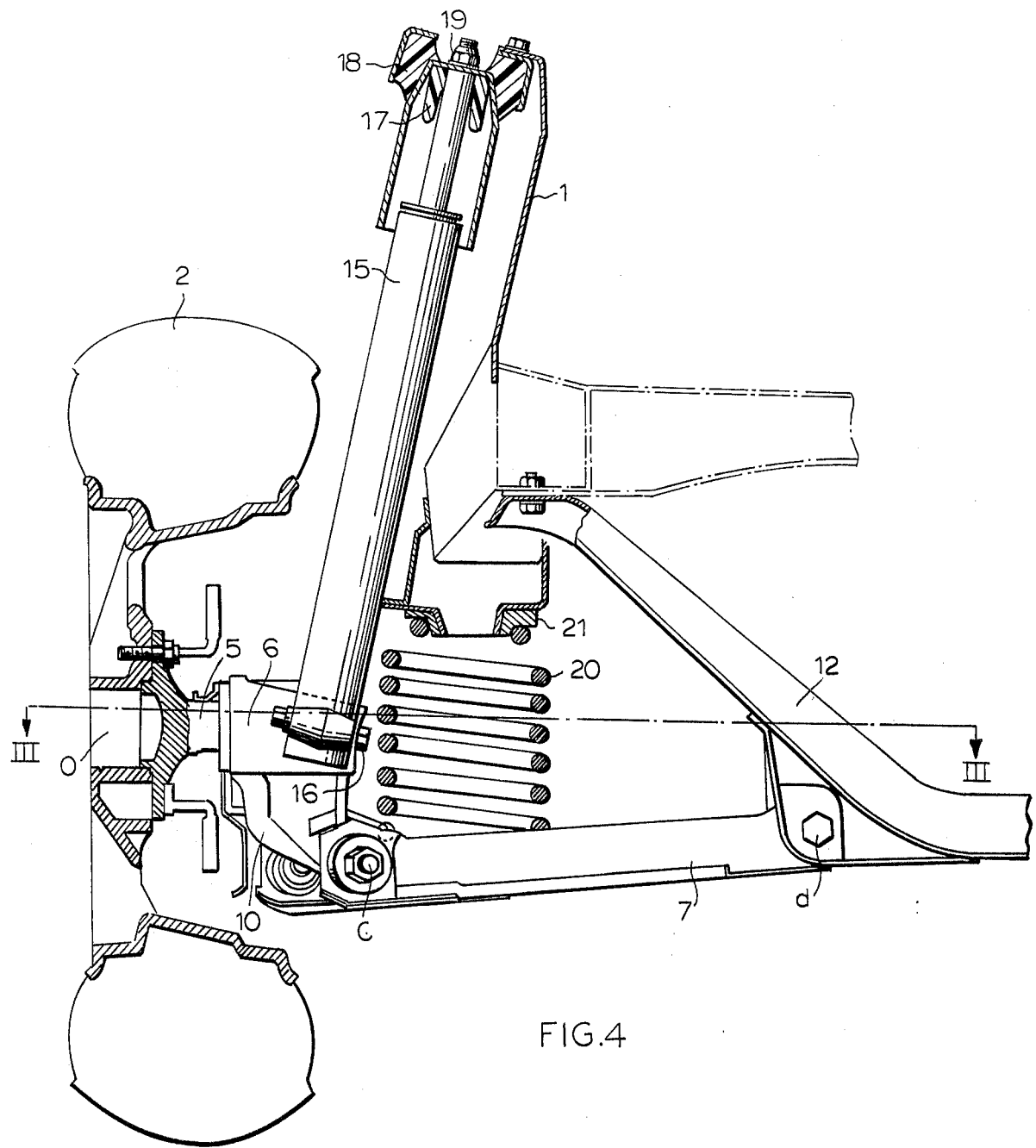
Figure 5:
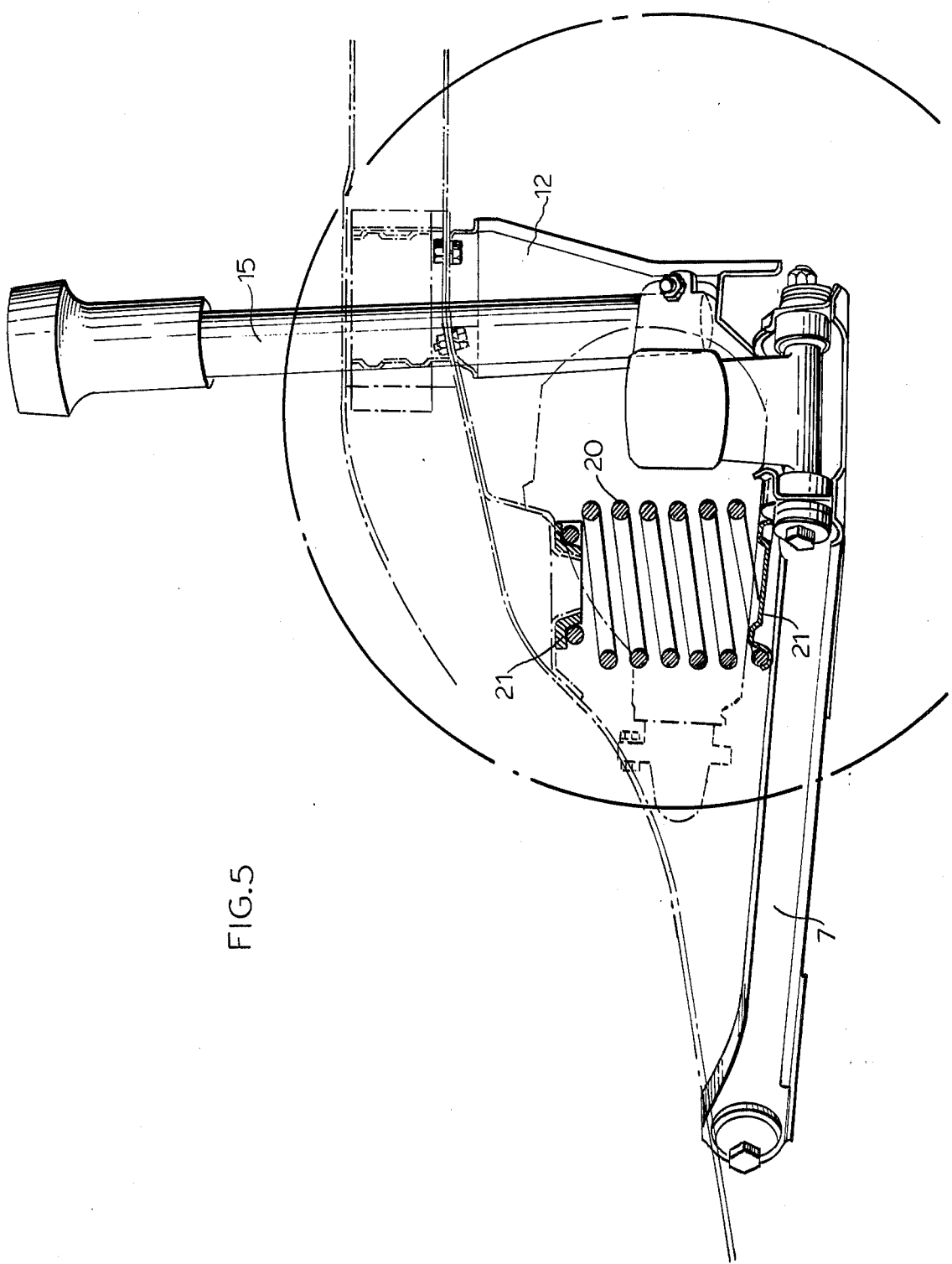

The above-described and other features and objects of this invention will become more apparent by reference to the following description taken in conjunction with the accompanying drawings, in which:

FIGS. 1 and 2 are schematic views showing a suspension system of the prior art, FIG. 1 being a plan view and FIG. 2 being a rear elevation view, FIG. 3 is a plan view showing the structure of one preferred embodiment of the present invention, FIG. 4 is a rear elevation view of the same structure, FIG. 5 is a side view of the same structure, FIGS. 6(A), 6(B), 6(C) and 6(D) show support points $a$, $b$, $c$ and $d$ of the suspension arm in cross sections, and FIGS. 7(A), 7(B), 8 and 9 are diagrammatic views for explaining the operation principle of the present invention.

Now the structure of the strut type independent suspension system according to the present invention will be described in connection with the preferred embodiment illustrated in FIGS. 3 to 6. In these figures, identical or equivalent parts are given like reference numerals.

The illustrated embodiment shows the application of the present invention to a rear wheel suspension system of a rear drive automobile. Reference numeral 1 designates a vehicle body, and numeral 2 designates a rear wheel. A drive shaft 4 having a universal joints 3 is coupled to an axle 5 that is fixedly secured to the center 0 of the rear wheel 2, within an axle bearing housing 6. Also, the axle bearing housing 6 is provided with a bracket 10 projecting downwardly therefrom. A suspension arm 7 having two arm portions 7a and 7b arranged generally in an L-shape as viewed on a horizontal projection, has the coupling portions of the two arm portions 7a and 7b pivotably mounted on the bracket 10 by means of a bolt 9 via rubber bushings 8 at two support points $b$ and $c$, as will be described later in more detail. The other end of the front arm portion 7a of the suspension arm 7 is pivotably mounted on a frame 11 of the vehicle body 1 at a front support point $a$ via a rubber bushing 13, while the other end of the rear arm portion 7b of the suspension arm 7 is pivotably mounted on a sub-frame or body frame 12 at a rear support point $d$ via a rubber bushing 14.

One example of the detailed structure of the coupling of said suspension arm 7 at the respective support points $a$, $b$, $c$ and $d$ is shown in FIGS. 6(A), 6(B), 6(C) and 6(D). In the coupling of the arm portion 7a of the suspension arm 7 to the frame 1 at the front support point $a$, as shown in FIGS. 6(A) and 6(B), a rubber bushing 13 having a hollow cylindrical inner sleeve 131 and an outer collar 132 secured thereto by baking, is rotatably fitted around a bolt 133 fixedly mounted on said frame 11. The bushing 13 is preliminarily fixedly secured to the body end of the suspension arm portion 7a by press fitting the outer collar 132 into the end of arm portion 7a. In addition, said bushing 13 is provided with a plurality of slits 134 extending in the axial direction as shown in the figure, so that the bushing 13 is relatively easily elastically deformed in response to twisting action of the arm portion 7a about a vertical axis.

In the coupling of the arm portion 7b of the suspension arm 7 to the frame 12 at the rear support point $d$, as shown in FIG. 6(C), a rubber bushing 14 having a hollow cylindrical inner sleeve 141 and an outer collar 142 press fitted thereto, is rotatably fitted around a bolt 143 fixedly mounted on said frame 12. The bushing 14 is preliminarily fixedly secured to the body end of the suspension arm portion 7b by press fitting the outer collar 142 into the end of arm portion 76. The bolt 143 is disposed parallel to a wheel center line $n$ described later as shown in FIG. 3, the rubber bushing 14 is constructed so as to be easily elastically deformed in response to a load applied thereto in the same direction as the axial direction of the bolt 143, and the body end (support point $d$) of the arm portion 7b is slidable in the axial direction of the bolt 143 a distance corresponding to the left and right gap clearance $x$ as shown in FIG. 6(C).

The coupling of the suspension arm 7 at the support points $b$ and $c$ supporting the axle bearing housing 6, has rubber bushing 8, which have inner sleeves 81 and outer collars 82 respectively secured thereto by baking, fitted around opposite end portions of a bolt 9 which is fitted through a hole 101 provided in the bracket 10 of the housing 6 to rotatably support the housing 6, as shown in FIG. 6(D). The outer collars 82 are preliminarily fixedly secured to the axle housing bearing end portions of the suspension arm 7 by press fitting.

Among the above-described support points $a$, $b$, $c$ and $d$, the support points $c$ and $d$, when viewed on a horizontal projection of the suspension system (in FIG. 3) positioned in such manner that a straight line $m$ connecting these support points $c$ and $d$ is parallel to and spaced at a predetermined distance $l$ rearwardly of the vehicle from a center line $g$ of the axle 5, and also intersects at right angles a wheel center line $n$ (a line passing through the center of the thickness of the wheel disc of the wheel 2 in the axial direction at right angles to the axis). The support points $a$ and $d$ are positioned on said horizontal projection in such manner that a straight line $q$ connecting these support points $a$ and $d$ is at a predetermined angle $\theta$ with respect to a longitudinal center line $p$ of the vehicle body 1, and the support points $b$ and $c$ are disposed on a straight line $r$ that is parallel to the aforementioned line $q$. The distance between the support points $b$ and $c$ is shorter than the distance between the support points $a$ and $d$, the straight line $m$ passing through the support points $c$ and $d$ and a straight line $s$ passing through the support points $a$ and $d$ intersect with each other at a point $u$ inside of said wheel center line $n$, and the intersection $u$ is spaced at a distance $h$ from the wheel center line $n$ along the straight line $m$. Reference numeral 15 designates a well-known strut provided with a shock absorber, the lower end of which is fixedly secured to the axle bearing housing 6 by means of a bolt 16, and the other end of which is pivotably and rockably supported by said vehicle body 1 by a bolt 19 and rubber bushings 17 and 18. A coiled suspension spring 20 is disposed so that its center is located within a triangular region on the suspension arm 7 surrounded by the straight line $q$, axle center line $g$ and straight line $s$, and it is interposed between the vehicle body 1 and the suspension arm 7 via spring receptacles 21 provided respectively thereon.

In the illustrated embodiment, the distance $l$ between the axle center line $g$ and the straight line $m$ was chosen to about 75 mm in order to prevent the structure in the proximity of the support points $d$ and $c$ from interfering with the drive shaft 4 and also for the purpose of assuring rigidity of the suspension arm 7 when subject to a cornering force, braking force, driving force, etc. for keeping the distance between the support points $b$ and $c$ large. Also, for the purpose of enhancing rigidity of the arm 7 against rotational motion about the axle center line $g$ upon emergency braking, the distance between the support points $a$ and $d$ has been made as long as possible, and for the purpose of preventing interference between the suspension arm 7 and the wheel 2, the angle $\theta$ between the vehicle body center line $p$ and the straight line $q$ was selected to be about 17°. Although it is most desirable to locate the intersection $u$ on the wheel center line $n$, in the illustrated embodiment, because of structural limitations, said intersection was disposed at a point spaced from the wheel center line $n$ inwardly a distance of 20 mm which corresponds to about 6% of the distance between the straight line $q$ and the straight line $r$ along the straight line $m$.

Figure 7A:
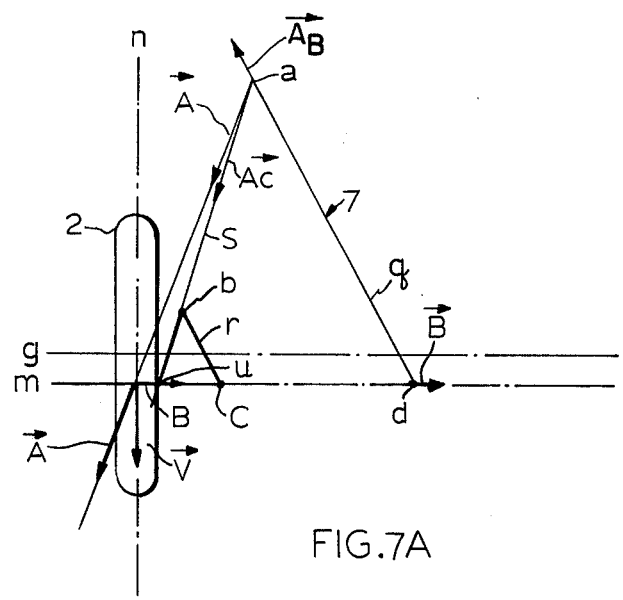

Now the operation of the suspension system according to the present invention will be described hereinunder with reference to FIGS. 7(A) and 7(B) which diagrammatically show the portion of the suspension system illustrated in FIG. 3. Referring to FIG. 7(A), when the wheel 2 is driven and the vehicle body 1 moves, a forward or backward force $\vec{V}$ (a driving or braking force) acts upon the wheel 2. Said forward or backward force $\vec{V}$ (a backward force in the illustrated embodiment) is broken down into components of force $\vec{A}$ and $\vec{B}$ at the intersection between the straight line $m$ and the wheel center line $n$, under the aforementioned support conditions of the suspension arm 7. Since the straight line $m$ passing through the support points $c$ and $d$ intersects the wheel center line $n$ at right angles thereto, the component of force $\vec{B}$ acts laterally at the support point $d$. On the other hand, the component of force $\vec{A}$ can be further broken down into sub-components of force $\vec{A}_C$ and $\vec{A}_B$. Since the rubber bushing 14 at the support point $d$ is constructed so as to be easily elastically deformed in the axial direction of the bolt, and since the elastic constant of the rubber bushing 14 is about $\frac{1}{5} \sim \frac{1}{4}$ times that of the rubber bushing 11 at the support point $a$, the distribution of the sub-component of force $\vec{A}_B$ to the support points $a$ and $d$ occurs in a ratio of about 4:1 to 5:1, so that the force exerted upon the support point $d$ in the forward or backward direction is very small, and the lateral component force $\vec{B}$ acts substantially only upon the support point $d$.

Figure 7B:
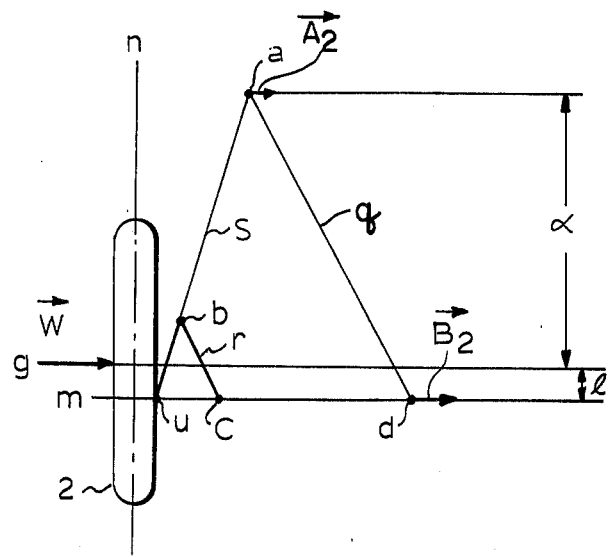

On the other hand, when an inward or outward force $\vec{W}$ (a cornering force or the like) (an inward force in the illustrated embodiment) acts upon the wheel 2 as shown in FIG. 7B, under the aforementioned support conditions of the suspension arm 7, this inward force can be broken down into components of force $\vec{A}_2$ and $\vec{B}_2$ exerted upon the support points $a$ and $d$ of the suspension arm 7. Thus in this case also, the component of force $B_2$ acts upon the support point $d$ in the lateral direction, and a forward or backward force is not exerted upon the support point $d$. Then, since the distance $l$ between the axle center line $g$ and the straight line $m$ is very small with respect to the distance $a$ between the front support point $a$ and the axle center line $g$, the conditions $\vec{B}_2 \approx \vec{W}$, $\vec{A}_2 \approx 0$ are satisfied and almost all of the inward or outward force $\vec{W}$ acts upon the support point $d$ as a laterally directed force. Accordingly, any bending stress acting upon the suspension arm 7 is relatively small.

Figure 8:
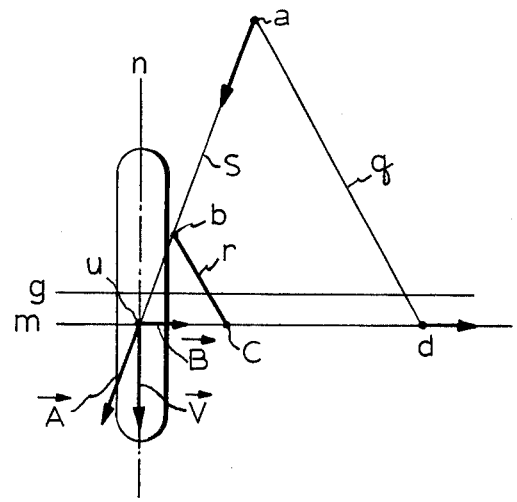
Figure 9:
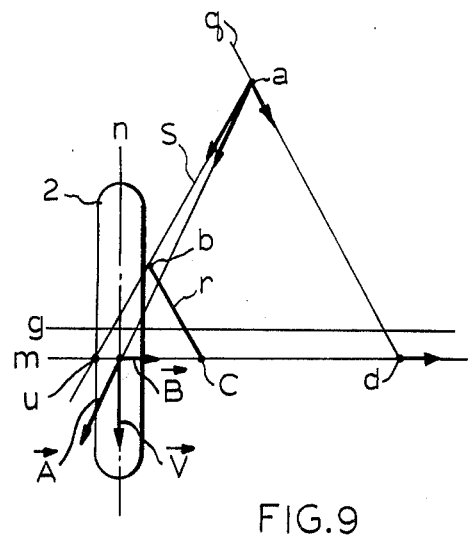

In addition, when the straight line $m$ and the straight line $s$ intersect each other at a point on the wheel center line $n$, the force distribution has the pattern illustrated in FIG. 8, and because of the different support conditions at the support points $a$ and $d$, respectively, substantially no forward or backward force is exerted upon the support point $d$. If the straight line $m$ and the straight line $s$ intersect each other at a point outside of the wheel center line $n$, the force distribution is hardly any different from the case where these straight lines $m$ and $s$ intersect each other at a point inside of the wheel center line $n$ and the forward or backward force exerted upon the support point $d$ is very small, as shown in FIG. 9. Still further, when an inward or backward force is exerted upon the wheel 2, in either one of the above-described two examples, the directions of the components of force exerted upon the support points are the same as those in the case where the intersection of the straight line $m$ and the straight line $s$ is located inside of the wheel center line $n$.

Since the strut type independent suspension system according to the present invention has the above-described construction and function, a forward or backward force is not exerted upon the sub-frame or body frame 12 by the suspension arm 7, so that the structure of the frame 12 can be simplified, and an under-floor space for disposing an exhausting system as well as an above-floor space for passengers' seats can be readily provided. In addition, since there is no need to provide a control arm and a control rod as is the case with the conventional system, the number of parts is reduced. This is not only advantageous with respect to the weight and cost of the system, but also this makes it possible to set an above ground height of the suspension arm 7 greater than in the conventional system and thereby reduce contact of the suspension arm 7 with the road surface when running on a bad road, because the support points $b$ and $c$ of the suspension arm 7 for coupling with the axle bearing housing 6 can be disposed so as to bridge across said housing 6 in the front rear direction.

In the strut type independent suspension system according to the present invention, if the vehicle body 1 is taken as a reference, the locus of the wheel 2 is determined by the locus of the axle bearing housing 6 which in turn depends upon the rocking motion of the suspension arm 7 and the rocking motion as well as extension and contraction of the strut 15, and because of the structural arrangement, most of the vertical reaction force exerted upon the wheel 2 is transmitted to the vehicle body 1 via the suspension arm 7 and the suspension spring 20 disposed thereon.

As described, since most of the vertical load is supported by the suspension arm 7 and since a moment is exerted by the suspension spring 20 so as to offset the moment caused by the road surface reaction force exerted upon the wheel 2, the bending moment applied to the strut 15 is very small, so that extension and contraction of the strut 15 can be achieved very smoothly, resulting in excellent comfortability. In addition, since the axle bearing housing 6 supporting the rear wheel 2 is supported at two support points $b$ and $c$, rotation of the wheel about a vertical axis is constrained, and so running stability is excellent.

In addition, because the suspension spring 20 is not disposed on the axis of the strut 15, the amount of offset of the strut 15 relative to the wheel 2 can be reduced in comparison to the case where a coil spring is coaxially disposed around the outer circumference of the strut 15, and for such reasons, the bending moment exerted by a hydraulic damping force caused by vertical movement of the wheel 2 can also be reduced.

While the present invention has been described above in connection with a preferred embodiment, it is clear that the invention should not be limited to such embodiment but that various changes in design could be made without departing from the spirit of the present invention. For example, substantially similar effects and advantages to those of the above-described embodiment can be achieved, provided that: the intersection $u$ of the straight line $s$ and the straight line $m$ is located at a distance from the wheel center line $n$ along the straight line $m$ either inside or outside of the wheel center line $n$, which is equal to or less than 15% of the distance between the straight line $q$ and the straight line $r$; the distance between the axle center line $g$ and the straight line $m$ is equal to or less than 100 mm; and the angle $\theta$ between the straight line $g$ and the vehicle body center line $p$ is equal to or less than 30°.

What is claimed is:

1. A strut type independent suspension system for a non-steerable wheel of a road vehicle, comprising a unitary suspension arm having two vehicle body pivotal support points thereon spaced generally in the direction of the length of the vehicle and two axle housing pivotal support points spaced generally in the direction of the length of the vehicle, an axle housing mounted on said suspension arm for rotation only around an axis between said axle housing pivotal support points, an axle on said axle housing extending perpendicular to the length of said vehicle, the vehicle body pivotal support point and the axle housing support point which are farthest from the middle of the vehicle body along the length thereof when viewed on a horizontal projection lying on a line parallel to said axle, said vehicle body support points when viewed on a horizontal projection lying on a line which is at an angle to the axis of said axle with the vehicle body support point of said line parallel to said axle lying closer to the center of the vehicle than the other vehicle body support point, said axis between said axle housing support points when viewed on a horizontal projection being parallel to said line on which said line between said vehicle body support points, and support means having one end connected to said axle housing and having the other end for connection to the vehicle body.

2. A strut type independent suspension system as claimed in claim 1 in which said support means is a shock absorber having one end pivotally connected to said axle housing and having the other end for pivotal connection to the vehicle body, and a suspension spring mounted on said suspension arm for engagement with the vehicle body.

3. A strut type independent suspension system as claimed in claim 2 in which said suspension spring is disposed within the area when viewed on a horizontal projection bounded by the axis of said axle, the line on which said vehicle body support points lie, and a line between the vehicle body support point and the axle housing support point which are closest to the middle of the vehicle body.

4. A strut type independent suspension system as claimed in claim 1 in which said line on which said vehicle body pivotal support point and said axle housing support point lie is spaced from the axis of said axle in a direction toward the end of the vehicle.

5. A strut type independent suspension system as claimed in claim 4 in which said line is spaced from the axis of said axle a distance no greater than 100 mm.

6. A strut type independent suspension system as claimed in claim 5 in which said distance is from 70 to 80 mm.

7. A strut type independent suspension system as claimed in claim 1 in which the distance between said axle housing pivotal support points is less than the distance between said vehicle body support points.

8. A strut type independent suspension system as claimed in claim 1 in which said suspension arm has mounting means at said vehicle body pivotal support point which is on said line parallel to said axle for mounting said suspension arm on the vehicle body for permitting movement of said pivotal support point substantially perpendicular to the axis of said axle.

9. A strut type independent suspension system as claimed in claim 8 in which said mounting means comprises a bolt for mounting on the vehicle and a rubber bushing around said bolt, the suspension arm being fixedly secured to said rubber bushing.

10. A strut type independent suspension system as claimed in claim 9 in which said rubber bushing has a structure which is easily elastically deformed when subjected to a load in the direction of the axis of said bolt.

11. A strut type independent suspension system as claimed in claim 1 in which said line on which said vehicle body support point and said axle housing support point lie and a further line on which the other vehicle body support point and the other axle housing support point lie intersect at a point spaced toward the vehicle from a line perpendicular to the axle and through a point on the axle at which the center of the thickness of a wheel is located when a wheel is positioned on said axle.

12. A strut type independent suspension system as claimed in claim 11 in which the space between said point of intersection is spaced from said line perpendicular to said axle a distance no more than 15% of the length of said line parallel to said axle between said axle housing support point and said vehicle body support point.

13. A strut type independent suspension system as claimed in claim 12 in which said distance is about 6% of said length.

14. A strut type independent suspension system as claimed in claim 1 in which said line on which said vehicle body support point and said axle housing support point lie and a further line on which the other vehicle body support point and the other axle housing support point lie intersect at a point spaced away from the vehicle from a line perpendicular to the axle and through a point on the axle at which the center of the thickness of a wheel is located when a wheel is positioned on said axle.

15. A strut type independent suspension system as claimed in claim 14 in which the space between said point of intersection is spaced from said line perpendicular to said axle a distance no more than 15% of the length of said line parallel to said axle between said axle housing support point and said vehicle body support point.

16. A strut type independent suspension system as claimed in claim 1 in which said line on which said vehicle body support point and said axle housing support point lie and a further line on which the other vehicle body support point and the other axle housing support point lie intersect at a point on a line perpendicular to the axle and through a point on the axle at which the center of the thickness of a wheel is located when a wheel is positioned on said axle.

17. A strut type independent suspension system as claimed in claim 1 in which the angle between the line on which said vehicle body support points lie and the axis of said axle is at least 60°.

18. A strut type independent suspension system as claimed in claim 17 in which said angle is about 73°.

* * * * *